(No Model.)
G. H. NEWELL.
FISHING REEL.
No. 551,645. Patented Dec. 17, 1895.
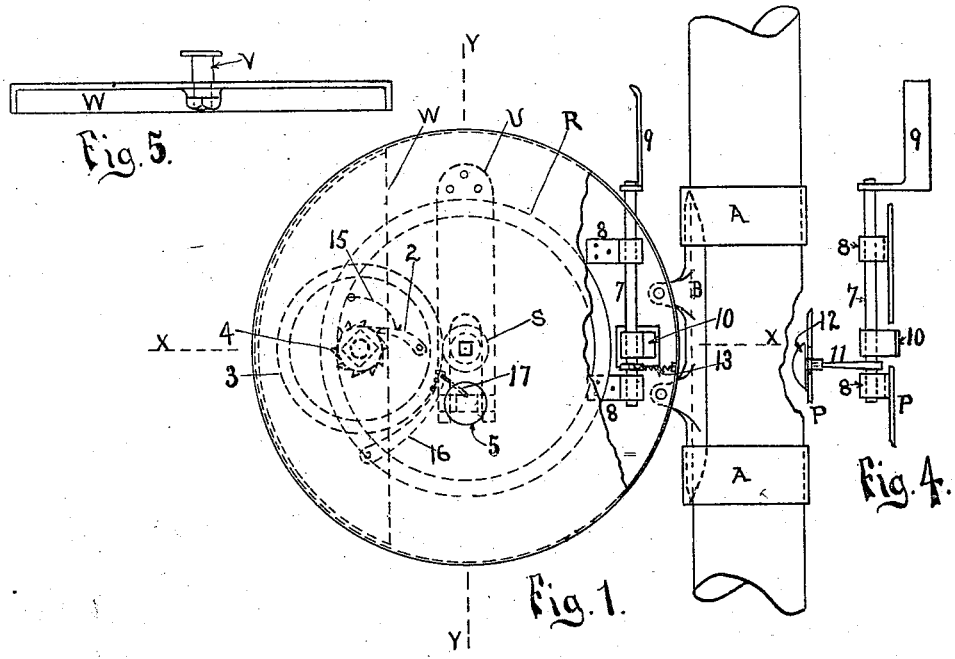
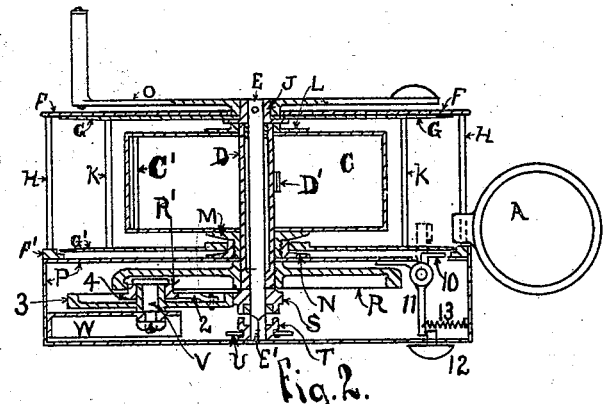
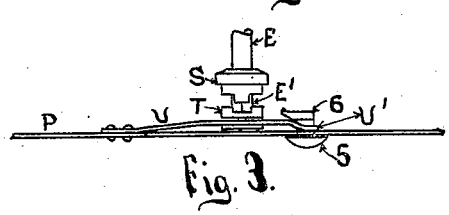
Witnesses
Christopher Hondelink
Ambrose C. Hindman
Inventor
George H. Newell
By Edward Taggart
His Attorney

UNITED STATES PATENT OFFICE.

GEORGE H. NEWELL, OF GRAND RAPIDS, MICHIGAN.

FISHING-REEL.

SPECIFICATION forming part of Letters Patent No. 551,645, dated December 17, 1895.

Application filed April 1, 1895. Serial No. 544,041. (No model.)

*To all whom it may concern:*

Be it known that I, GEORGE H. NEWELL, a citizen of the United States, residing at the city of Grand Rapids, in the county of Kent and State of Michigan, have invented certain new and useful Improvements in Fishing-Reels, of which the following is a specification.

This invention relates to certain new and useful improvements in fishing-reels, and more particularly to that class of reels in which the mechanism for operating the reel is located outside of the fish-pole itself, and the objects of my invention are, first, to produce a reel which can be used without a hand-piece and which can be readily changed from an automatic to a free-running reel; second, to simplify the mechanism and produce a reel which can be easily managed and not liable to get out of order; third, to improve other details of construction hereinafter more fully described. These objects I accomplish by means of the mechanism illustrated in the accompanying drawings, in which—

Figure 1 is an end elevation of the reel, showing the end opposite to the one bearing the crank. Fig. 2 is a sectional view on line X X of Fig. 1, showing the general arrangement of the shafts and mechanism and the position of the case which surrounds the reel-actuating spring. Fig. 3 is a partial section on line Y Y of Fig. 1, showing the mechanism for connecting the clutch by means of which the reel is changed from an automatic to a free-running reel. Fig. 4 is a detached plan view of the brake and connected mechanism. Fig. 5 is a detached view of the plate which supports a part of the machinery.

Similar letters and numerals refer to similar parts throughout the several views.

I use an ordinary framework for attaching the reel to the fish-pole, which framework is shown by A A and B.

C is a casing within which the actuating-reel spring is wound. The casing C, with other parts, also serves as a support for the operating-shafts hereinafter described.

D is a hollow shaft, to which the inner end of the actuating-spring is attached, said attachment being at the point shown by D'. The other end of the actuating-spring is attached at a point C' to the case C. The spring used is preferably an ordinary coil-spring or clock-spring, and as such springs are well known I have not shown the same in the figures, it being easily understood by reference to the spring-case and the points of attachment of the spring. The spring will be wound from the inside.

E is a shaft placed inside the hollow shaft D, and is provided with a square end E', or with an end which is not round in cross-section, the object being to keep it in engagement with the clutch T, and to still allow for a lateral motion of the clutch along the shaft. Instead of using the square-shaped end a key or other suitable means may be used, the object being merely to allow the clutch T to slide upon the shaft, but always to revolve with it. I provide a casing which incloses the reel and spring, which casing consists of the ends F and F'' and rods H which connect F to F'.

G G' are the end plates of the reel spool or drum, and K K are connecting-rods which connect the end plates G and G' and form the body of the spool upon which the fish-line is wound.

L is a flanged collar rigidly attached to the casing C, and forming a bearing for the hollow shaft B.

M is also a flanged collar rigid with C at one end, and at the other end attached by a screw-thread to the collar N, collar N being flanged and attached to M, and also made rigid with the casing P, said casing P inclosing the operating machinery which revolves the reel, the power being conveyed by the outer shaft D to mechanism within the casing P, which mechanism connects the said power with the internal shaft E.

R is a large internal gear in the case P, and rigid with the hollow shaft D, and adapted to engage with the pinion R'.

S is a pinion loosely placed on the shaft E and adapted to engage with the gear-wheel 3, which gear-wheel 3 being on the same shaft as the pinion R' is moved with said shaft, as hereinafter described—that is, the power is conveyed by means of the hollow shaft through the gear R to the pinion R', and from the pinion R' to the gear 3, and from the gear 3 to the pinion S.

The pinion S is placed loosely on the shaft

D, preferably, and held from moving along said shaft by means of a collar or any other suitably means, the attachment of S to the shaft being through the clutch T, as hereinafter described, the said pinion S being provided with clutch projections which engage with the clutch T on the square end E' on the shaft E, said clutch T being moved into and out of engagement with S, as hereinafter described.

U is a spring adapted to retain the clutch T in engagement with the pinion S except when the same is thrown out of engagement by means of the button 5, and its connections, as hereinafter described.

U' shows the end of the spring U, bent so as to form an incline, and to be operated by the cam 6, which cam 6 is connected to and moves with the button 5.

In Fig. 3 I have shown the clutch T in engagement with the pinion S. By moving the button 5 to the left, as shown in Fig. 3, the cam 6 will press down upon the spring U and disengage the clutch T from the pinion S.

In Fig. 2 I have shown the clutch T disengaged from the pinion S.

V is a short shaft supported in the plate W and adapted to support the gear 3 and also the pinion R' and ratchet-wheel 4. The position of the plate W is shown in Fig. 1.

2 is a pawl, preferably provided with a spring, which engages with the ratchet-wheel 4.

3 is the gear, hereinbefore described, which engages with the pinion S. The gear-wheel 3 has a long hub which revolves on the short supporting-shaft V.

4 is the ratchet-wheel which is made rigid with the pinion R', and which, in connection with the pawl 2, gives the forward motion to the gear 3, the ratchet 4 and the pinion R' revolving on the extended hub of gear 3 as a journal.

The object of using the ratchet 4 and the pawl 2, for the purpose of giving the forward motion to the gear 3, is to allow the crank O to be turned backward without reversing the motion of the gear 3, or conveying the backward motion to the shaft to which the spring is attached when the automatic part of the mechanism is locked together.

In reels as ordinarily constructed, by reversing the motion of the reel the spring is broken or detached from its operative shaft, but in my device the connection, by means of the ratchet-pawl, gives the forward motion and prevents the backward motion.

I provide a friction-brake 10 which may be used for the purposes hereinafter mentioned.

7 is the shaft supporting the friction-brake which is used for stopping and retaining the machinery in any desired position.

8 8 are bearings or supports for the shaft 7, said bearings or supports 8 being fastened to the side of the casing P.

9 is a lever or finger-piece attached to the shaft, and serves as a convenient means for imparting a rotary motion to the shaft 7 for the purpose of disengaging the brake in order to allow the reel to run freely when desired.

The brake-shoe 10 is shown in a plan view in Fig. 4, in side elevation in Fig. 1, and in end elevation in Fig 2.

11 is an arm preferably rigid with the shaft 7 and extending outwardly on the side of the shaft opposite to the finger-piece or lever 9 and has an attached spring 13 which acts, by its tension, to constantly apply the brake-stop, except when the brake is thrown out by the finger-piece 9, and also when held out by the button 12. The button 12 is placed outside of the casing, (see Fig. 4,) and is provided with a small projection or lug which holds the arm 11 down when the reel is used as a free-running reel; but when the reel is not to be used as a free-running reel the button is pressed out of engagement with the arm 11. The spring 13 is connected with the arm 11 at one end and with the casing P at the other end, and serves to keep the brake in engagement with the ratchet 4 by means of a spring 15.

16 is a locking-arm pivoted to the plate W preferably, and connected by a connecting-rod 17 to cam 6, or to the stem of the button 5. This arm 16 is provided with teeth adapted to engage with the teeth on gear 3, and to lock the machinery in place to prevent the reel-spring from operating the mechanism when the reel is used as a free-running reel.

17 is a connecting-rod which connects the locking-arm 16 to the cam 6 of the button 5 for the purpose specified.

The operation of my invention is as follows: Starting with the line wound on the reel spool or drum, the clutch T being in engagement with the clutch projections on pinion S, and the brake 10 held in contact with the spool G, by means of the spring 13 and the arm 11, completes the engagement, and the locking-arm 16 is disengaged from the gear 3 and the line is now wound and the spool unwound and the whole ready for use. The lever 9 is pressed by the finger so as to relieve the brake 10, and then the line can be run out. As the line runs out it revolves the spool G G' K, and the spool being rigid with the shaft E this shaft revolves with the spool. This revolves the clutch T, which, being in engagement with the pinion S, said pinion S being in engagement with the gear 3, revolves said gear, and the gear 3 by means of the pawl 2 revolves the pinion R'. The pinion R' being in engagement with the internal gear R, which is rigid with the hollow shaft D, revolves said hollow shaft. The inner end of the operating-spring being attached to this hollow shaft at the point D' and the upper end of the spring being attached to the casing C at C', the revolving of said hollow shaft D winds up the spring from the inside as in the case of an ordinary clock-spring. By removing the finger-piece from the lever 9, the line is held out and the spring wound. By relieving the lever 9, through pressure, the spring automatically winds the line, reversing the operation of the mechanism.

The reel is converted into a free-running reel as follows: Button 5 is moved so as to move the cam 6 into position to press the spring U outwardly, which spring U carries the clutch T out of engagement with pinion S. The locking-arm 16 by means of the connection 17 is moved into engagement with the gear 3, thus disconnecting the reel-spool from the operating-spring and locking the machinery so as to retain the spring in whatever position it may happen to be at the time of moving the button. The lever 9 is now pressed so as to remove the brake 10 from engagement with the spool, and the button 12 is moved so that its inner projection engages the spring-arm 11, and this holds the brake 10 out of engagement with the spool. This reel is now an absolutely free-running reel to be operated simply by the crank alone.

Having thus described my invention, what I claim to have invented, and desire to secure by Letters Patent, is—

1. In a fishing reel the combination of a drum or spool supporting case, a drum or spool supported by the case, an actuating spring, a hollow shaft, connected to and operated by said actuating spring, an internal shaft within said hollow shaft, suitable connecting mechanism between the hollow shaft and the internal shaft conveying the motion generated by the spring from the hollow shaft to the internal shaft and thence to the revolving spool or drum, a suitable disconnecting and connecting mechanism whereby the spring and spring operated mechanism may be detached from the drum or spool so as to make a free running reel, and may be connected so as to make it an automatic reel, the said supporting case with all mechanism detachably connected to the fish pole, substantially as described.

2. The combination of a spool or drum, a casing within the spool or drum, an actuating spring situated within such casing, a hollow shaft passing through the casing actuated by the said spring, a supplemental casing or chamber at the end of the spring-inclosing case, a gear on the end of the hollow shaft within said supplemental casing, a shaft within said hollow shaft bearing a pinion, gear connections between the gear on the hollow shaft and the pinion on the internal shaft, and suitable clutch mechanism for connecting and disconnecting the hollow shaft from the internal shaft, substantially as and for the purpose described.

3. A supporting case with suitable means for attaching the same to the fish pole, a revolving spool or drum supported by said casing, a spring-inclosing case situated within the revolving drum, a spring situated within said spring-inclosing case having its outer end attached to said case and its inner end attached to the hollow shaft, a hollow shaft passing through said spring supporting case, an internal shaft passing through said hollow shaft and into a supplemental chamber supported within the casing, a gear on said hollow shaft within said supplemental chamber, an internal shaft within said hollow shaft provided with a pinion within said supplemental chamber, gear connections between the hollow shaft and the supplemental shaft, a clutch supported by the said internal shaft, and mechanism for moving said clutch into engagement with the pinion on the internal shaft, thereby connecting the mechanism so that the internal shaft is moved by the revolution of the external shaft, and suitable means for disengaging said clutch, substantially as described.

4. In combination with an internal and external shaft supported within the casing, a pinion loosely mounted on the internal shaft provided with a clutch, a clutch mounted also on said internal shaft and adapted to be moved into and from engagement with said pinion, whereby the power is conveyed from the external shaft to the internal shaft, a spring bearing a cam, and a button upon the end of the supporting shell or case for operating the said clutch, substantially as described.

5. In combination with a supporting case, a drum or spool, an actuating spring, a hollow shaft to which said actuating spring is attached, an internal shaft, a supplemental chamber into which said external and internal shafts project, a gear upon said external shaft, a pinion upon said internal shaft, an intermediate gear provided with a ratchet wheel and a pawl, a swinging arm provided with notches adapted to engage said intermediate gear for the purpose of locking the mechanism and spring in any required position, and suitable mechanism for moving said locking arm into and out of engagement, substantially as described.

6. In a fishing reel the combination of a revolving drum or spool, a brake provided with a lever or finger piece for operating the same, a spring arm and a spring adapted to hold said brake normally in engagement with the said drum, a button for operating the said spring arm, and a projection adapted to engage with said arm for the purpose of retaining the said brake out of engagement when desired, substantially as described.

In witness whereof I have hereunto set my hand and seal in the presence of two witnesses.

GEORGE H. NEWELL. [L. S.]

Witnesses:
CHRISTOPHER HONDELINK,
M. LONIER WRIGHT.